Patented May 16, 1950

2,508,335

UNITED STATES PATENT OFFICE 2,508,335

FUNGICIDAL COMPOSITION COMPRISING A 2,4,5 - TRICHLOROPHENYL CHLOROACETATE

Clarence L. Moyle, Clare, and Richard H. Gruenhagen, Midland, Mich., assignors to The Dow Chemical Company, Midland, Mich., a corporation of Delaware No Drawing. Application March 20, 1948, Serial No. 16,142

2 Claims. (Cl. 167—30)

This invention relates to fungicides and is particularly concerned with a method for controlling fungus organisms with compositions employing as a toxic ingredient 2,4,5-trichlorophenyl monochloroacetate and 2,4,5-trichlorophenyl dichloroacetate.

Many materials have been proposed and employed with varying degrees of success in an effort to protect seeds, plants, and plant parts from the attack of fungus organisms. Some have had a limited use due to their instability, odor, low toxicity, or a tendency to irritate the skin of humans. A particular disadvantage of many materials has been their relatively high vapor pressures, whereby they are rapidly volatilized from compositions in which they are employed and from surfaces to which they are applied, so that an extended protection against fungi is not obtained. Another disadvantage has been the effect of many fungicidal materials upon higher plant life when used in amounts and concentrations necessary to control fungus organisms. Thus, the disease may be held in control, but only with a simultaneous decrease in the number of seeds which germinate, or with such leaf surface injury that the productiveness of the plants is materially reduced.

According to this invention, it has been found that 2,4,5 - trichlorophenyl monochloroacetate and 2,4,5-trichlorophenyl dichloroacetate may be applied to seeds and plants in amounts necessary to control fungus organisms without causing injury to the seeds, plants, or plant parts, or adversely affecting the germination of the seed. The residual toxicity of these compounds enables them to control the growth of fungus organisms over an extended period of time.

The compounds may be incorporated with various finely divided solid carriers, such as bentonite, fuller's earth, diatomaceous earth, volcanic ash, pyrophyllite, starch, wood flours, talc, chalk and the like, to form agricultural dusts. These compositions may also be employed as concentrates and subsequently diluted with an additional inert solid carrier to form dusts, or suspended in water or other inert liquid carrier to form sprays.

Similarly, the compounds may be incorporated in intimate mixture with a wetting and emulsifying agent, such as sodium lauryl sulphate, glyceryl oleate, sulfonated aromatic hydrocarbons, blood albumin, sulfonated oils, metal caseinates, complex organic ester derivatives, sulfite pulping waste products, aromatic aliphatic ether alcohols and the like, to form concentrates. The toxicant should comprise from 10 to 95 per cent by weight of such concentrate. The choice of wetting and emulsifying agent and the amount thereof employed are determined by the ability of the agent to facilitate the dispersion of the concentrate in water to produce a fungicidal spray.

Alternatively, the compounds may be used in simple aqueous dispersion or incorporated in other conventional carriers, such as solvents, oil-in-water emulsions, or aerosols, either as the sole toxic ingredient or in combination with other fungicidal and insecticidal materials. Other toxicants used in such combinations must not react with the 2,4,5-trichlorophenyl esters in such a manner as to reduce their effectiveness or result in a mixture which is injurious to seeds, leaves, flowers, buds, or fruit.

From about 5 to 95 per cent by weight of the compounds are employed in concentrates, and from about 0.03 to 10 per cent in sprays and dusts for application to living vegetation. The exact amount of toxicant employed is largely determined by the susceptibility of the organism to be controlled, the tolerance of the plant under treatment, and the circumstances under which the control is to be accomplished.

In operating in accordance with this invention, good control of fungus organisms is obtained with sprays containing at least 0.25 pound of the toxicant per 100 gallons. Such sprays are applied to plants and plant parts in either dormant or summer applications. In spraying it is usually sufficient for the infected or susceptible surfaces to be thoroughly wet with the liquid dispersion employed.

Dust compositions, comprising from about 1 to 10 per cent by weight of the compounds, are applied in such amounts that a relatively uniform coverage of the treated surfaces is obtained.

Dust compositions, comprising from 10 to 100 per cent by weight of the compounds, can be used as seed disinfectants to control the damping-off and decay organisms affecting seeds and newly emerged seedlings. The treatment of the seed may be accomplished by shaking from 1 to 8 ounces of the dust with each bushel of seed. Seeds which may be treated substantially as described include cotton, radish, onion, cucumber, celery, Swiss chard, carrot, pea, barley, buckwheat, tomato, okra, cabbage, bean, spinach and the like.

In other operations, aqueous or oil spray compositions containing the compounds may be applied to orchard floor surfaces and litter, either in the summer or fall, for the control of fungus organisms and spores in infected areas. Similarly, dormant plant surfaces may be thoroughly wet with such sprays to aid in the control of the overwintering spores of apple scab and related organisms. The compounds may also be applied to fruit and vegetables to prevent the attack of fungus organisms during shipment and storage.

The new compounds employed in this invention are crystalline solids, comparatively stable to light and air, of low volatility, somewhat soluble in many organic solvents, relatively insoluble in water, and non-corrosive to the skin of man and higher animals.

They may be prepared by reacting directly substantially equimolecular proportions of chloroacetyl chloride or dichloroacetyl chloride and 2,4,5-trichlorophenol. The reaction is carried out at the refluxing temperature of the reaction mixture, and is accompanied by the evolution of hydrogen chloride. Upon the completion of the reaction, the desired ester product may be obtained in substantially pure form by either fractional distillation or recrystallization of the crude reaction mixture.

In a copending application, Serial No. 16,141, filed concurrently, methods for preparing these compounds have been disclosed.

The following examples set forth specific embodiments of the invention but are not to be construed as limiting the same.

Example 1

50 parts by weight of 2,4,5-trichlorophenyl monochloroacetate (melting at 80.5° C.) was mixed with 50 parts of talc and hammermilled through a 1/16 inch screen. Cotton seed, which had a heavy natural infection of the fungus organisms causing cotton anthracnose, was uniformly dusted with this product in the amount of 1.5 ounces per bushel of seed. Both treated and untreated seed were planted in sand. Such treated cotton seeds gave an emergence of seedlings of 92 per cent, 97 per cent of which were disease free. Untreated cotton seed gave an emergence of 73 per cent, 46 per cent of the seedlings being disease free.

Example 2

50 parts by weight of 2,4,5-trichlorophenyl monochloroacetate was mixed with 50 parts by weight of fuller's earth and hammermilled through a 1/16 inch screen. Onion seed was uniformly dusted with this product in the amount of 4.8 ounces per bushel of seed. A determination of emergence was made with both treated and untreated seed planted in sandy loam. The treated onion seed gave an emergence of 37 per cent. Untreated seed gave an emergence of 28 per cent.

Example 3

A determination of emergence was made with tomato seed, which was uniformly dusted with the composition of Example 2 in the amount of 7.2 ounces per bushel. Both treated and untreated seed were planted in sandy loam. Treated tomato seed gave an emergence of seedlings of 31 per cent. Untreated seed gave an emergence of 21 per cent.

Example 4

A determination of emergence, as carried out in Example 2, was made with treated and untreated cucumber seed. Seed which had been uniformly dusted with the composition of Example 2 in the amount of 2.4 ounces per bushel, was planted in sandy loam. The treated seed gave an emergence of 37 per cent, while the untreated seed, planted in the same soil, gave an emergence of 25 per cent.

Example 5

Determinations were carried out with barley seed which had a heavy natural infection of covered barley smut (*Ustilago hordei*). Untreated seed and seed which had been uniformly dusted with the composition of Example 2 in the amount of one ounce per bushel, were planted in sandy loam. An average of 29 seedlings emerged per five foot row originally planted with treated seed. The average number of seedlings from untreated seed per five foot row was 31. Four months following the planting, the barley heads were examined to ascertain what control of covered barley smut had been obtained. It was found that 78 per cent of the heads of the plants which had matured from treated seed were disease free. 100 per cent of the heads from the control plants were heavily infected with covered barley smut.

Example 6

Alaska pea seeds were uniformly dusted with the composition of Example 1 in the amount of 1.8 ounces per bushel. These seeds were planted in soil previously inoculated with the organisms *Pythium spp.*, *Fusarium spp.*, and *Rhizoctonia spp.* Simultaneously, untreated Alaska pea seeds were planted in the same soil. After three weeks, 20 separate test plots with their controls were examined to ascertain the emergence of seedlings. The treated Alaska pea seeds gave an average emergence of disease-free seedlings of 87 per cent. The untreated seeds gave an emergence of 64 per cent.

Example 7

50 parts by weight of 2,4,5-trichlorophenyl dichloroacetate (melting at 46° C.) was mixed with 50 parts of fuller's earth and hammermilled through a 1/16 inch screen. Alaska pea seed was dusted with this product in the amount of 1.8 ounces per bushel. The dusted seed was planted in soil previously inoculated with the disease organisms *Pythium spp.*, *Fusarium spp.*, and *Rhizoctonia spp.* The treated pea seeds gave an emergence of seedlings of 92 per cent, all of which were free of disease. Untreated pea seeds planted as a control in the same soil, gave an emergence of 77 per cent.

Example 8

8 parts by weight of 2,4,5-trichlorophenyl monochloroacetate and one part of sodium lauryl sulphate were dispersed in a small quantity of water and ballmilled for 2½ hours. The resulting concentrate was dispersed in water to obtain a spray composition containing 2 pounds of toxicant and 0.25 pound of sodium lauryl sulphate per 100 gallons. This composition was sprayed on a stand of cranberry bean plants, and the plants subsequently inoculated with bean mildew. Two weeks after inoculation it was found that a 97 per cent control of bean mildew had been obtained without chemical injury to the plants. In a check operation, the plants were found to be covered with bean mildew two weeks following inoculation.

*Example 9*

A concentrate having the following composition by weight was prepared by mixing and grinding the constituents twice through a 1/32 inch screen:

| | Percent |
|---|---|
| 2,4,5-trichlorophenyl monochloroacetate | 50 |
| (Daxad #27) sodium salt of a condensed alkyl aryl sulfonic acid | 2 |
| (Nekal A) sodium alkyl naphthalene sulfonate | 0.25 |
| Ferric oxide | 1.5 |
| Fuller's earth | 46.25 |

The concentrate was dispersed in water to obtain a spray composition containing ½ pound of toxicant per 100 gallons. This composition was sprayed on a stand of cranberry bean plants, and the plants subsequently inoculated with bean mildew. Two weeks following the inoculation, it was found that an 87 per cent control of the disease had been obtained without any chemical injury to the plants. In a check test in which no fungicide was employed, the plants were found to be covered with mildew two weeks after inoculation.

We therefore distinctly point out and claim as our invention:

1. A fungicide dust composition comprising a finely divided inert solid carrier and dispersed thereon as an active toxic ingredient a member of the group consisting of 2,4,5-trichlorophenyl monochloroacetate and 2,4,5-trichlorophenyl dichloroacetate.

2. A seed disinfectant composition comprising a finely divided inert solid carrier and dispersed therein as an active toxic ingredient 2,4,5-trichlorophenyl monochloroacetate, the 2,4,5-trichlorophenyl monochloroacetate being present in the amount of at least one per cent by weight of the dust.

CLARENCE L. MOYLE.
RICHARD H. GRUENHAGEN.

REFERENCES CITED

The following references are of record in the file of this patent:

UNITED STATES PATENTS

| Number | Name | Date |
|---|---|---|
| 1,498,641 | Sulzberger | June 24, 1924 |
| 2,412,510 | Jones | Dec. 10, 1946 |
| 2,449,787 | Meyer | Sept. 21, 1948 |

OTHER REFERENCES

Tarbell et al., J. A. C. S., vol. 65, pages 2169–2174 (1943).